US008266669B2

(12) United States Patent
Kelly et al.

(10) Patent No.: US 8,266,669 B2
(45) Date of Patent: Sep. 11, 2012

(54) METHOD AND APPARATUS FOR STORING AN INTERACTIVE TELEVISION PROGRAM

(75) Inventors: Declan Patrick Kelly, Eindhoven (NL); Philip Steven Newton, Eindhoven (NL); Jingwei Tan, Shanghai (CN); Liang Gan, Shanghai (CN); Jun Shi, Shanghai (CN); Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 543 days.

(21) Appl. No.: 10/548,341

(22) PCT Filed: Mar. 3, 2004

(86) PCT No.: PCT/IB2004/050194
§ 371 (c)(1),
(2), (4) Date: Sep. 7, 2005

(87) PCT Pub. No.: WO2004/082289
PCT Pub. Date: Sep. 23, 2004

(65) Prior Publication Data
US 2006/0212915 A1      Sep. 21, 2006

(30) Foreign Application Priority Data

Mar. 12, 2003 (EP) .................................... 03100626

(51) Int. Cl.
*H04N 7/16* (2011.01)
(52) U.S. Cl. ......... 725/142; 725/135; 725/136; 725/139
(58) Field of Classification Search .................. 725/136, 725/142
See application file for complete search history.

(56) References Cited

U.S. PATENT DOCUMENTS

| | | | |
|---|---|---|---|
| 5,768,539 A | 6/1998 | Metz et al. | |
| 6,302,795 B1 * | 10/2001 | Ito | 463/29 |
| 6,304,553 B1 * | 10/2001 | Gehman et al. | 370/235 |
| 6,427,238 B1 * | 7/2002 | Goodman et al. | 725/136 |
| 2001/0037507 A1 | 11/2001 | Mori | |
| 2002/0042909 A1 | 4/2002 | Van Gageldonk et al. | |
| 2002/0059623 A1 | 5/2002 | Rodriguez et al. | |
| 2002/0059645 A1 * | 5/2002 | Soepenberg et al. | 725/137 |
| 2002/0120790 A1 | 8/2002 | Schwalb | |
| 2002/0120945 A1 | 8/2002 | Schwalb | |
| 2002/0170074 A1 * | 11/2002 | Houldsworth et al. | 725/142 |
| 2003/0081609 A1 * | 5/2003 | Breslow et al. | 370/394 |
| 2003/0115222 A1 * | 6/2003 | Oashi et al. | 707/200 |
| 2004/0002969 A1 * | 1/2004 | Perng et al. | 707/3 |

FOREIGN PATENT DOCUMENTS

| | | |
|---|---|---|
| JP | 8106415 A | 4/1996 |
| WO | 9965230 A1 | 12/1999 |
| WO | 0133852 A1 | 5/2001 |

* cited by examiner

*Primary Examiner* — Robert Hance

(57) ABSTRACT

A method and device for storing an interactive television program for playback at a later point in time, wherein said interactive television program comprises at least one interactive television application. The applications are transmitted inside modules (11, 12) through a data carousel (2) within a transport stream (20). The method comprises receiving the transport stream, parsing the stream for application modules and storing them as a storage stream on a storage medium (31). The storage stream is stored separate from said transport stream (20). The data or object carousel is recorded outside the Transport Stream and recorded like a stream, preferably as a single file. This file is a sequence of modules with some header information preceding the modules making playback faster as the information needed to obtain the objects from a module is located directly in the header of that module. Furthermore, the solution according to the invention solution is platform independent.

Figure 1:
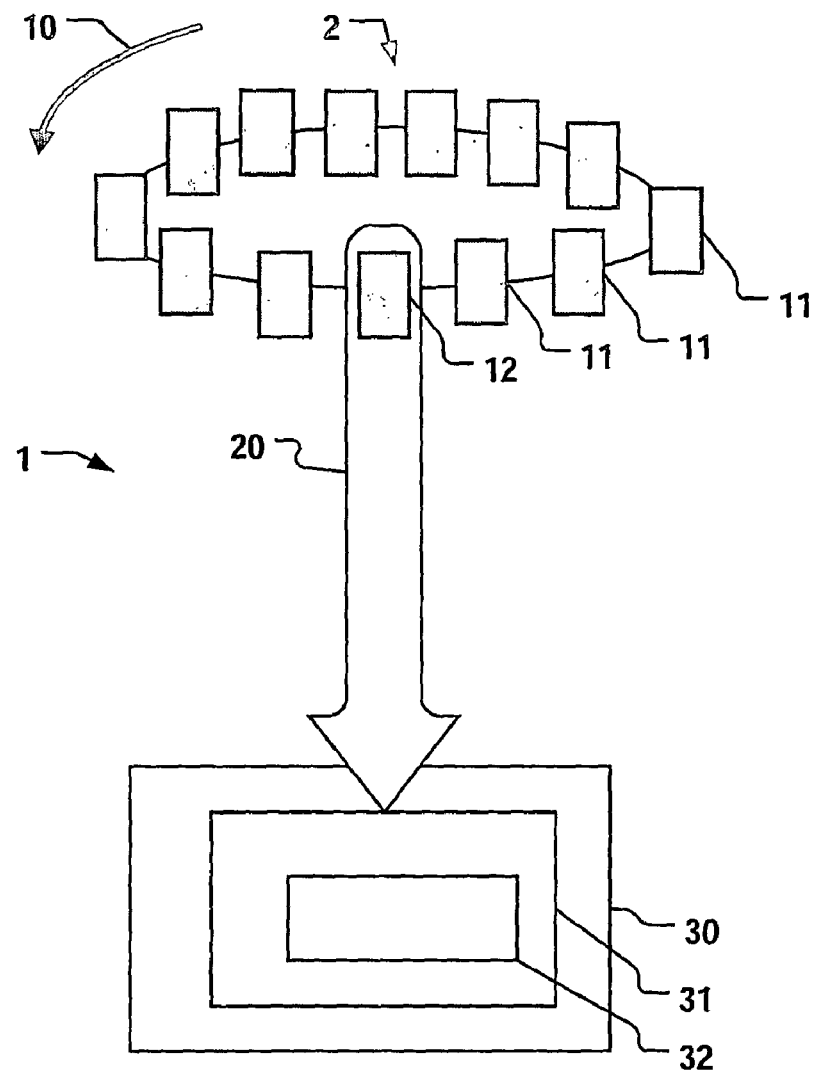

10 Claims, 4 Drawing Sheets

METHOD AND APPARATUS FOR STORING AN INTERACTIVE TELEVISION PROGRAM

This invention relates in general to the field of interactive television and more particularly to the recording of interactive television content and even more particularly to the recording of interactive television applications.

Interactive television (iTV) is becoming more and more popular. An example of interactive television is the Multimedia Home Platform (MHP), which is a digital video broadcasting (DVB) standard intended to combine digital television (DTV) with interactivity and access to the Internet and the World Wide Web. DTV service providers offer a large variety of audio-visual (A/V) television programs and also of applications that allow the interaction of the viewer/user with the TV set and its content. In digital video broadcast systems a broadcaster can broadcast applications together with the video in a MPEG2 transport stream (TS). These types of applications can be run on digital television receivers, such as Set Top Boxes (STB) and allow a viewer to interact with the video. Examples of these applications are Electronic Program Guides, Betting applications, T-Commerce etc. For these types of applications to run the receiving device must support the interactive TV platform (iTV) for which the application was designed. Examples of interactive TV platforms are MHP, MEG-5, Dase, Liberate, OpenTV. Some of these platforms are proprietary and some are open standards such as MB, MHEG-5 and Dase.

Interactive television content, such as MHP, transmits applications in a Transport Stream (TS) inside modules through a Digital Storage Media Command and Control (DSMCC) object carousel. The DSMCC-Modules are transmitted in the same TS as the audio/video content. The DSMCC data/object carousel defines how and when to send modules/files containing applications in the TS together with the audio-visual content down a broadcast channel. There is no connection to the server for a receiving device to ask for wanted files. All files are repeatedly sent all the time, e.g. once every 10 seconds. Interactive television terminals, e.g. MHP terminals, such as a Set Top Box (STB), look for the files they need as they come around.

More specifically, the applications are broadcast in the MPEG2 transport stream in a protocol that provides an open distributed object computing architecture. This protocol is called DSMCC U-U (Digital Storage Media Command and Control User to User) and it is based on Corba (Common Object Request Broker Architecture). This protocol sits on top of the above mentioned protocol called the DSMCC Data carousel. This carousel provides a transport mechanism that allows a server to present a set of data modules by cyclically repeating the content of the modules one or more times.

Similar to today's video recorders for analogue television broadcasts using video tapes for recording broadcast streams, digital video recorders for interactive television are developed using either a harddisk or removable media such as optical discs for storing recorded broadcasts. The digital video recorders for interactive television record both A/V television content and applications for playback at a later point in time.

When recording interactive television, iTV modules/files are extracted from the Transport Stream. These modules are generally stored outside the Transport Stream in separate files. In some cases the stored modules are re-inserted into the Transport Stream for playback over a digital interface to an external STB with an MHP stack.

The previously mentioned transmission standards are designed for access to applications and files in a broadcast case. When the application and the files it uses are stored on a storage medium, such as a disk, as part of a recording, the information contained in the transmission parameters is lost. Also the file format of the various standards differ, so providing a recording and playback solution for one standard does not necessarily work for another standard. Therefore a need exists for an iTV recording solution that is as generic and effective as possible so that it will work for many interactive TV standards.

In WO 01/33852 A1 a method is disclosed for recording of pushed interactive data of a program. Data is received from a data stream comprising a data carousel. The data stream is parsed and data objects comprised in the data carousel are retrieved and stored as files on a mass storage device. A data carousel is always stored as a whole data carousel, either as a single file or as separate files for the individual data objects. When the objects in the carousel change, a new file or set of files is started for the new carousel. Furthermore, a header is saved with the file consisting of an carousel ID and version, as well as starting and ending times of the entire carousel. The disclosed method has the drawback that an entire carousel has to be available when recording. Furthermore, recording of the modules cannot start before the last module is extracted from the transport stream. This has the disadvantage that it is necessary to wait until all the modules are extracted from the transport stream. Implementation is thus complicated and expensive, as large buffers are required. Additionally the described art has a major disadvantage regarding playback performance because the entire carousel has to be loaded to a large buffer before playing back the interactive application. This may involve an inconvenient time delay and expensive large buffers are needed.

According to the invention, the above problems are solved as follows. When recording the MHP application the application files are stored separately from the transport stream. These files are transmitted in the DSMCC carousel in BIOP (Broadcast Interoperability Protocol) messages. There are different types of these messages. One type of these messages may be used to transmit a directory structure and another message may be used to send a file. These messages are in turn encapsulated in DSMCC data carousel modules.

For finding the files the DSMCC protocol defines special control messages which are transmitted in the MPEG2 private sections. There are two types of control messages, one is the DSI (Download Server Initiate) message and the other is the DII (Download Info Indication) message. The DSI message defines the Service Gateway info. This contains the object references for finding the broadcast objects or files in the carousel. The DSI contains a profile body for the top-level directory of the carousel, i.e. the service gateway. The profile body contains references to the location of an object and a reference to the DII message of the module that contains the object. The DII message contains delivery parameters of the module that contains the object.

According to the invention, the DSMCC Object Carousel is recorded outside the Transport Stream and recorded like a stream. The result is that the DSMCC Object Carousel is recorded in a single file on the storage medium, e.g. a disc. This file is a sequence of modules with some header information preceding the modules. The DSMCC object carousel is thus recorded outside the stream, but still recorded like a stream. Playback is thus faster as the information needed to obtain the objects from a module is located directly in the header of that module. There is no need to parse the information for all the modules to find the information for a particular module, which would be the case with one single information file. Furthermore, the solution according to the invention is platform independent.

The present invention has the advantage over the prior art that it generates one single file which is a concatenation of modules, i.e. the data carousel objects, with a description of the module content as a header attached to the start of each module in the before mentioned file. Recording of the modules can thus start when the first module is extracted from the transport stream, there is no need to wait until all the modules are extracted from the stream. This makes implementation straightforward and requires small buffers, i.e. buffers for just one module instead for all modules of a carousel to be recorded. Additionally the present invention improves playback performance as loading of the interactive application is possible to start as soon as the first module is processed.

Hence, the present invention overcomes the above-identified deficiencies in the art and solves the above problems by providing a method, a system and a computer readable medium according to the appended patent claims.

According to one aspect of the invention, a method of storing an interactive television program for playback at a later point in time is provided. The interactive television program comprises interactive television applications, and these applications are transmitted inside modules through a data carousel within a transport stream. The method comprises the following steps. First, the transport stream is received. Then the transport stream is parsed for application modules. Subsequently the application modules are stored as a storage stream on a storage medium, wherein the storage stream is stored separated from said transport stream.

According to another aspect of the invention, there is provided an apparatus, which is adapted for storing an interactive television program and which is adapted for playback of said interactive television program at a later point in time. The interactive television program comprises interactive television applications, wherein said applications are transmitted inside modules through a data carousel within a transport stream. The apparatus comprises receiving means for the transport stream, parsing means for parsing the transport stream for application modules, and storing means for storing the application modules as a storage stream on a storage medium. The storage stream is stored separated from the transport stream by the storing means. Furthermore, the mentioned means of the apparatus are operatively connected to each other.

According to yet another aspect of the invention, a computer-readable medium is provided. The medium has embodied thereon a computer program for processing by a computer. The computer program is a program for storing an interactive television program for playback at a later point in time, wherein said interactive television program comprises interactive television applications. These applications are transmitted inside modules through a data carousel within a transport stream. The computer program comprises the following code segments: a first code segment for receiving the transport stream, a second code segment for parsing the transport stream for application modules, and a third code segment for storing the application modules as a storage stream on a storage medium. The code segments further instruct the computer to store said storage stream separated from said transport stream.

Figure 2:
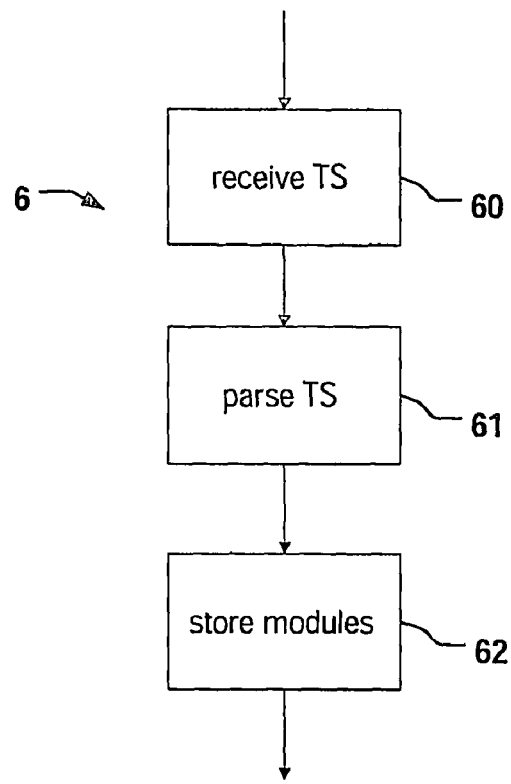
Figure 3:
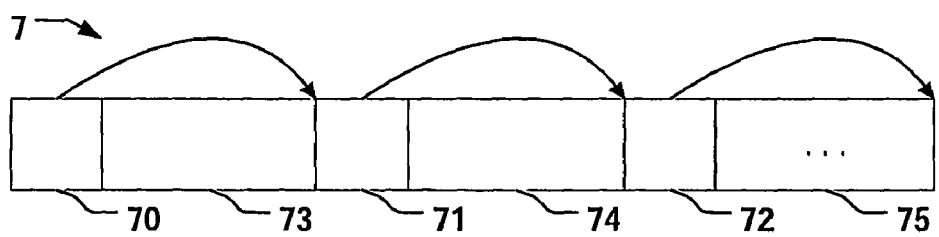
Figure 4:
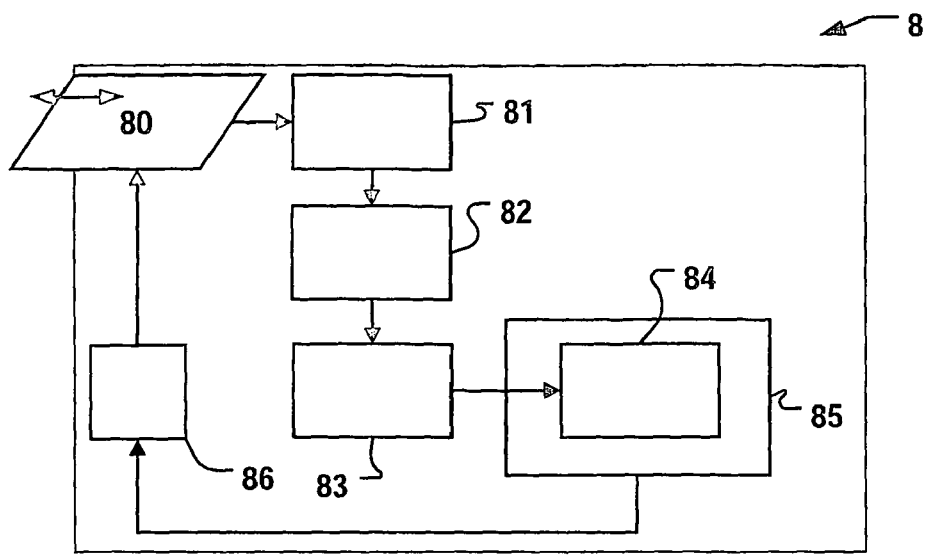
Figure 5:
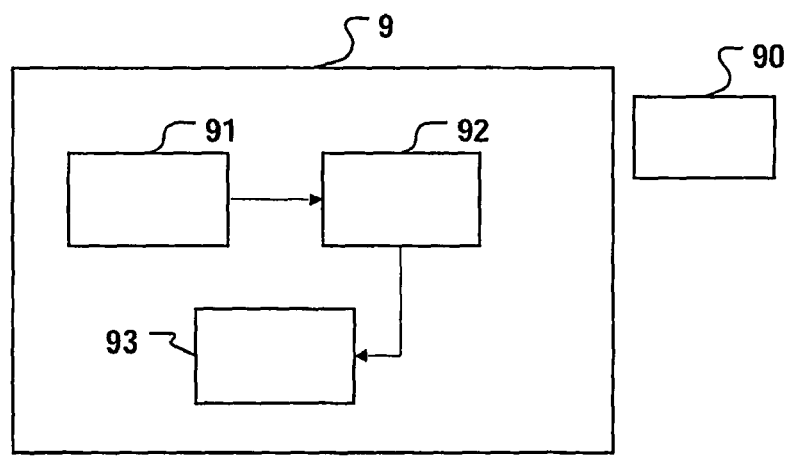
Figure 6:
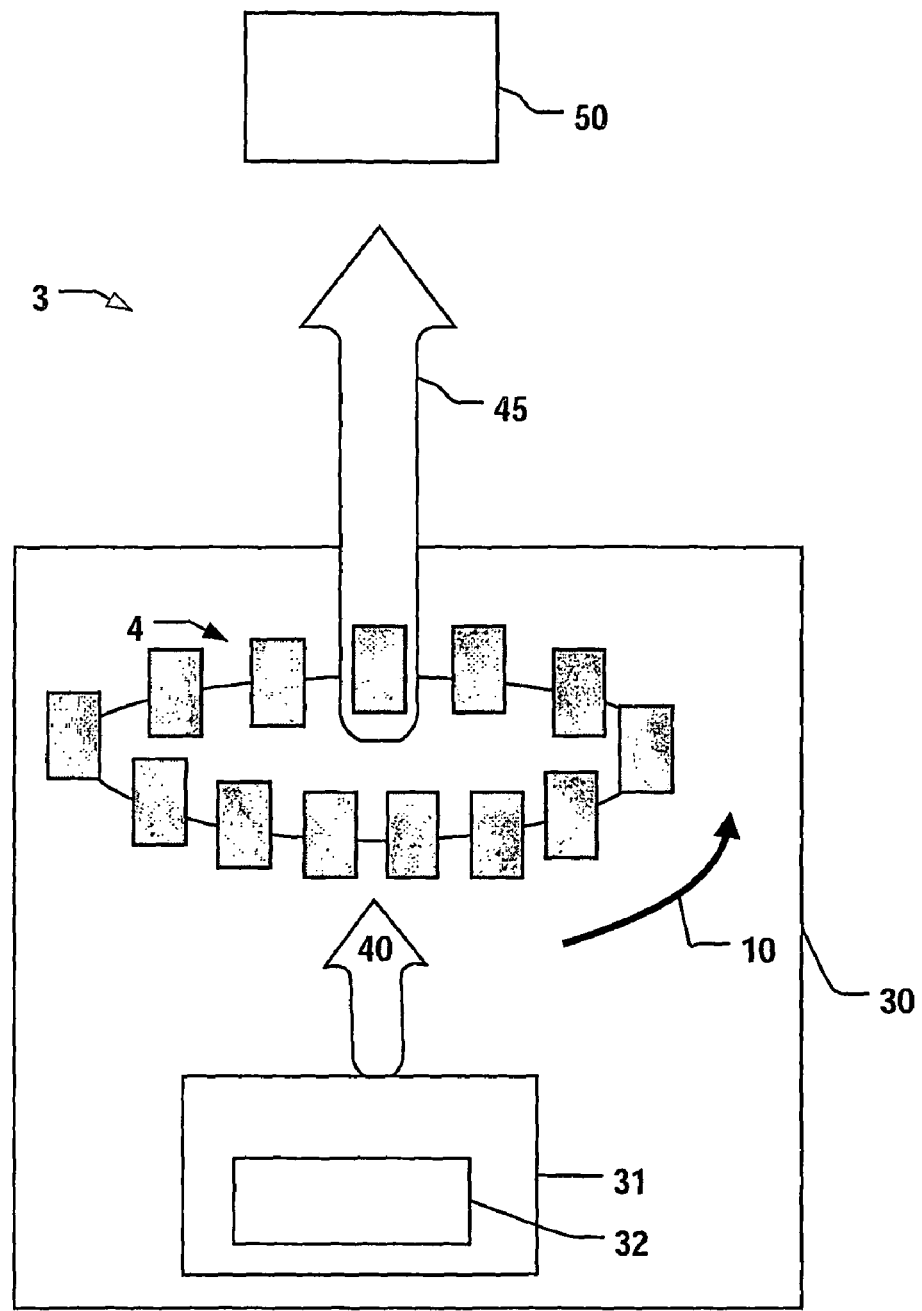

Further objects, features and advantages of the invention will become apparent from the following description of embodiments of the present invention, reference being made to the accompanying drawings, in which FIG. 1 is a schematic diagram over an iTV recording system in recording mode, applying the method of the invention, FIG. 2 is a flowchart illustrating an embodiment of a method according to the invention, FIG. 3 is a diagram showing an exemplary file structure of an iTV storage stream stored according to an embodiment of the invention, FIG. 4 is a schematic diagram showing an embodiment of the device according to the invention, FIG. 5 is a schematic diagram showing the computer readable medium according to the invention, and FIG. 6 is a schematic diagram over an iTV recording system in playback mode.

FIG. 1 shows a schematic overview over an iTV recording system 1 in recording mode, applying the method of the invention. Interactive television content, such as MHP, transmits applications in a Transport Stream (TS) inside modules through a Digital Storage Media Command and Control (DSMCC) object carousel 2. Audio-visual content is transmitted in the same TS inside modules through a DSMCC data carousel. Interactive television content, such as MHP, is transmitted over a digital interface 20, such as in a Transport Stream (TS), inside modules 12 through a Digital Storage Media Command and Control (DSMCC) object carousel 2. Audio-visual content is transmitted in the same TS 20. Arrow 10 indicates the rotation of objects 11 in the carousel over time. The TS 20 is received by a recording device 30, such as an MHP video recorder. Recording device 30 comprises a storage medium 31 on which files/objects 32 are recorded from the TS.

According to the invention, the DSMCC Object Carousel is recorded outside the Transport Stream and recorded like a stream. According to a preferred embodiment of the invention, the DSMCC Object Carousel is recorded in a single file 7 on the storage medium 31, e.g. a recordable DVD, CD, or a harddisk in a STB or an interactive television recorder. This file 7 is created as a sequence of modules 73, 74, 75, . . . , with some header information 70, 71, 72, . . . , preceding the modules, as illustrated in FIG. 3. The DSMCC object carousel is thus recorded outside the stream, but still recorded like a stream. A stream is in this context defined as a continuous sequence of data objects, such as files or application modules, said sequence having a first data object and a finite number of subsequent data objects.

More specifically, during recording the incoming DSMCC Object carousel is parsed and redundancy is preferably removed. For each module extracted from the carousel of the TS, a header is generated, wherein the header at least contains:

the version number of the module, such as a module ID, the time the module was finished loading from the stream (using PCR (Program Clock Reference) timestamps from the MPEG stream), the Directories and objects contained in the module, pointers to the objects located in the module, and a pointer to the start of the next module header in the stream, or alternatively the length of the module.

Also the file preferably contains entries for stream events. These consist of a short header followed by the stream event information. The header contains thus a point to the length of the stream event entry and the time in the stream when the event was received or for scheduled events the time when the event should occur.

The structure of the stored file, such as file 7, is built up during recording. Preferably the header of the first module 70 contains the DSI message. The DSI message indicates the root of the carousel. When the DSI message changes then this is an indication that a new set of modules is transmitted. When the version of one module changes then this does not change the DSI message. Therefore, when a new DSI is received, a new module file is generated. When the version of one module changes then the new version of that module is added to the modules file. The generated header of this new version of the module will indicate that it is a new version because the new module will have the same module ID as the earlier version of that module. The module 73 placed at the start of the file preferably contains the directory objects directly located under the Service Gateway (the top-level directory). The header 71 for the second module 74 will reference the directory- and file objects located under the one from the first module and so forth for all the other modules 75, . . . . In this way it is easier during playback to re-create the structure in the info file in memory. Thus, parsing all the modules a second time is avoided.

Additionally this approach has the advantage that the DSMCC Object Carousel can be treated like a stream and incrementally recorded on disc. There is no need to cache the complete Object Carousel in order to generate a complete header at the start of the file before starting to record it to disc.

According to another embodiment of the invention, the DSI control message is extracted from the carousel during recording. The DSI, as well as the DII messages are preferably retrieved directly from the MPEG2 private sections filter. The DSI contains the top-level directory also referred to as the service gateway. From the DSI the BIOP profiles are parsed and stored in the MHP info file as the top branches of the tree. Typically these profiles will refer to objects that contain directory Messages. These directory messages contain BIOP (Broadcast Interoperability Protocol) profiles for the underlying objects. These BIOP profiles are stored under the directory node in the MHP info file. This process continues until all the BIOP profiles refer to file or stream event objects. When this happens, the bottom of the tree is reached. A reference to the module where the file is located is thus added to the BIOP profile.

According to another embodiment of the invention FIG. 4 shows a device 8 for storing an interactive television program and for playback at a later point in time. The interactive television program comprises at least one interactive television application, which is transmitted inside modules through a data carousel within a transport stream. Preferably the carousel is a DSMCC data/object carousel. Device 8 comprises receiving means 81 for receiving the transport stream 80, parsing means 82 for parsing the transport stream for application modules comprised in transport stream 80, storing means 83 for storing said application modules as a storage stream 84 on a storage medium 85. Hereby the storage stream 84 is stored separate from said transport stream by said storing means 83. Means 81, 82 and 83 are operatively connected to each other.

The stored data 84 is played back with a means 85 for playing back said data inside modules through a DSMCC Data/Object Carousel over said digital interface and from said storage medium 85. This will be described below in more detail in connection with FIG. 6.

According to another aspect of the invention as illustrated in FIG. 5, there is provided a computer-readable medium 9 having embodied thereon a computer program for processing by a computer 90. The computer program stores an interactive television program for playback at a later point in time, wherein said interactive television program at least comprises one interactive television application being transmitted inside modules through a data carousel within a transport stream. The computer program comprises a first code segment 91 for receiving the transport stream, as well as a second code segment 92 for parsing the transport stream for application modules, and a third code segment 93 for storing said application modules as a storage stream on a storage medium. Hereby the storage stream is stored separated from said transport stream by the third code segment 93.

When the file, which was stored according to the above description, is read into memory for playback, the data is preferably restructured to build up a directory tree from the individual headers. Preferably, a database is created in memory from all the headers. In this way the information is used to easily find a required file on a disc. This is less efficient than having a separate MHP info file because all header parts of the modules have to be read. However, in practice most, and probably all, module information will be cached in memory. Generating the equivalent of the MHP info file on playback is therefore easily accomplished, preferably as describe above.

FIG. 6 is a schematic overview over an iTV recording system 3 in playback mode. Files/modules 32 from the, according to FIG. 1, recorded interactive television content, are transferred from storage medium 31, to a DSMCC object carousel 4, as indicated by arrow 40. As shown in FIG. 1, the files/modules and audio-visual content are broadcast via a digital interface 45, such as in a Transport Stream (TS), inside modules through the DSMCC object carousel 4. Arrow 10 indicates the rotation of objects 11 in the carousel over time. The TS 45 is received by a receiving device 50, such as a Set Top Box (STB).

The present invention has been described above with reference to specific embodiments. However, other embodiments than the above described are equally possible within the scope of the appended claims, e.g. different carousel structures, file structures, performing the above method by hardware or software, etc.

Furthermore, the term "comprising" does not exclude other elements or steps, the terms "a" and "an" do not exclude a plurality and a single processor or other unit may fulfil the functions of several of the units or circuits recited in the claims.

Also, it will be apparent to a person skilled in the art that the words 'transport stream' cover a Transport Stream as well as a Program Stream as methods of transfer or broadcast of data like audio-visual data.

In summary, the invention relates to method and device for storing an interactive television program for playback at a later point in time, wherein said interactive television program comprises at least one interactive television application. The applications are transmitted inside modules (11, 12) through a data carousel (2) within a transport stream (20), preferably a MPEG 2 stream. The method comprises receiving the transport stream, parsing the transport stream for application modules and storing the application modules as a storage stream on a storage medium (31). The storage stream is stored separated from said transport stream (20). The data carousel (2) may be a Digital Storage Media Command and Control (DSMCC) carousel. The DSMCC Object Carousel is recorded outside the Transport Stream and recorded like a stream, preferably as a single file. This file is a sequence of modules with some header information preceding the modules. The DSMCC object carousel is thus recorded outside the stream, but still recorded like a stream. Playback is thus faster as the information needed to obtain the objects from a module is located directly in the header of that module. Furthermore, the solution according to the invention solution is platform independent.

The invention claimed is:

1. A method of storing an interactive television program on a storage medium for playback at a later point in time, said interactive television program comprising at least one interactive television application, said applications being transmitted inside modules through a data carousel within a transport stream, said method comprising the steps of:
receiving said transport stream;
parsing the transport stream for application modules;
generating respective headers for the parsed application modules; and
storing, by incrementally recording, said application modules as a concatenation of modules in a single file having a structure that is built up during recording, without waiting for the completion of the parsing the transport stream for application modules,
wherein the single file comprises a storage stream,
wherein said storage stream is stored outside of and separately from said transport stream, and
wherein the single file as the storage stream comprises a sequence of stored application modules, each stored application module being preceded by the generated respective header, each generated respective header comprising storage information on at least the subsequent application module,
wherein each of said generated respective headers comprises at least:
a version number of the module,
a time the module was finished loading from the transport stream,
directories and objects contained in the module,
pointers to the objects located in the module, and
a pointer to the start of the next module header in the stream.

2. A method according to claim 1, wherein said data carousel is a DSMCC data/object carousel.

3. The method as claimed in claim 1, wherein said method further comprises the step of:
removing redundancy in said carousel before storing said application modules.

4. The method as claimed in claim 1, wherein the module placed at the start of the file contains directory objects directly located under a top-level directory and the header for the second module references directory- and file objects located under the first module.

5. The method as claimed in claim 1, wherein said method further comprises the steps of:
extracting a Download Server Initiate (DSI) message from the carousel; and
storing said DSI message at least in the header of the first module of said storage stream.

6. The method as claimed in claim 1, wherein said transport stream is an MPEG2 transport stream.

7. The method as claimed in claim 5, wherein said transport stream is an MPEG2 transport stream, and wherein said DSI message is extracted from an MPEG2 private sections filter from said MPEG2 transport stream.

8. The method as claimed in claim 1, wherein the storage medium is an optical disk.

9. An apparatus for storing an interactive television program on a storage medium, and for playing back said stored interactive television program at a later point in time, said interactive television program comprising at least one interactive television application, said applications being transmit inside modules through a data carousel within a transport stream, wherein said apparatus comprises:
a receiver for receiving said transport stream;
a parser for parsing the transport stream for application modules;
means for generating a respective header for each parsed application module; and
storing means for storing, by incrementally recording, said application modules as a concatenation of modules in a single file having a structure that is built up during recording, without waiting for the completion of parsing the transport stream for application modules,
wherein the single file comprises a storage stream, whereby said storage stream is stored on said storage medium outside of and separately from said transport stream by said storing means, and wherein said single file comprises a sequence of stored application modules, each stored application module being preceded by the generated respective header, and each generated respective header comprising storage information on at least the subsequent application module,
wherein each of said generated respective headers comprises at least:
a version number of the module,
a time the module was finished loading from the transport stream,
directories and objects contained in the module,
pointers to the objects located in the module, and
a pointer to the start of the next module header in the stream.

10. A non-transitory computer-readable storage medium having embodied thereon a computer program for processing by a computer, enabling storing of an interactive television program on a storage medium, and playing back of the stored interactive television program at a later point in time, wherein said interactive television program comprises at least one interactive television application being transmitted inside modules through a data carousel within a transport stream, the computer program comprising code segments for causing the computer to:
receive said transport stream,
parse the transport stream for application modules,
generate a respective header for each parsed application module, and
store, by incrementally recording, said application modules as a concatenation of modules in a single file having a structure that is built up during recording, without waiting for the completion of parsing the transport stream for application modules,
wherein the single file comprises a storage stream, whereby said storage stream is stored on said storage medium outside of and separately from said transport stream, and wherein said single file comprises a sequence of stored application modules, each stored application module being preceded by the generated respective header, and each generated respective header comprising storage information on at least the subsequent application module,
wherein each of said generated respective headers comprises at least:
a version number of the module,
a time the module was finished loading from the transport stream,
directories and objects contained in the module,
pointers to the objects located in the module, and
a pointer to the start of the next module header in the stream.

* * * * *